United States Patent
Moshrefzadeh et al.

(10) Patent No.: US 6,636,355 B2
(45) Date of Patent: Oct. 21, 2003

(54) MICROSTRUCTURED REAR PROJECTION SCREEN

(75) Inventors: Robert S. Moshrefzadeh, Oakdale, MN (US); Steven J. Rhyner, St. Paul, MN (US); Peter F. Cullen, Woodbury, MN (US); Patrick A. Thomas, Maplewood, MN (US); Richard J. Pokorny, Maplewood, MN (US); John C. Nelson, The Sea Ranch, CA (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/748,977

(22) Filed: Dec. 27, 2000

(65) Prior Publication Data

US 2002/0080484 A1 Jun. 27, 2002

(51) Int. Cl.[7] .......................... G03B 21/56; G03B 21/60
(52) U.S. Cl. ...................... 359/460; 359/453; 359/454; 359/459
(58) Field of Search ................ 359/460, 443, 359/453, 454, 455, 456, 459

(56) References Cited

U.S. PATENT DOCUMENTS

| 3,218,924 | A | * | 11/1965 | Miller | 359/456 |
|---|---|---|---|---|---|
| 3,279,314 | A | | 10/1966 | Miller | 359/453 |
| 4,573,764 | A | | 3/1986 | Bradley | 359/453 |
| 4,605,283 | A | | 8/1986 | Stanton | 359/453 |
| 4,701,019 | A | * | 10/1987 | Fitzpatrick | 359/453 |
| 5,462,700 | A | | 10/1995 | Beeson et al. | 264/1.27 |
| 5,481,385 | A | * | 1/1996 | Zimmerman et al. | 349/62 |
| 5,768,014 | A | | 6/1998 | Lee | 359/457 |
| 6,064,521 | A | * | 5/2000 | Burke | 359/443 |
| 6,163,402 | A | * | 12/2000 | Chou et al. | 359/443 |
| 6,236,386 | B1 | * | 5/2001 | Watanabe | 345/98 |
| 6,424,786 | B1 | * | 7/2002 | Beeson et al. | 385/146 |

FOREIGN PATENT DOCUMENTS

| DE | 0 433 486 A1 | 12/1989 |
|---|---|---|
| JP | Hei 9-93518 | 4/1977 |
| WO | WO 96/21884 | 7/1996 |
| WO | WO 00/60974 | 10/2000 |

OTHER PUBLICATIONS

U.S. patent application Ser. No. 09/348,809, "Rear Projection Screen Using Internal Reflection" 49 pages + 16 pages of drawings.

* cited by examiner

*Primary Examiner*—Russell Adams
*Assistant Examiner*—Magda Cruz
(74) *Attorney, Agent, or Firm*—Robert J. Pechman (57) ABSTRACT

Disclosed is a rear projection screen that includes a plurality of tapered waveguides and a light absorbing layer disposed over the tops of the waveguides, but that does not completely fill the spaces between the waveguides, thereby forming an interstitial low index region under the light absorbing layer and between the waveguides. The low index interstitial region can include air or a material that has a lower index of refraction than the waveguide material. This rear projection screen construction can give rise to increased efficiency and higher contrast, as well as allow for more design freedom in constructing screens that have desired characteristics such as viewing angle, viewing asymmetry, and the like. Also disclosed are methods for making the described microstructured rear projection screen.

7 Claims, 4 Drawing Sheets

MICROSTRUCTURED REAR PROJECTION SCREEN

The present invention is directed generally to a rear projection screen and more particularly to a rear projection screen that incorporates microstructures to waveguide the light passing through the screen and a light absorptive layer to enhance contrast.

BACKGROUND

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It may also be desirable that the screen spread the light over a large viewing space. Unfortunately, as one screen characteristic is improved, one or more other screen characteristics often degrade. For example, the horizontal viewing angle may be changed in order to accommodate viewers positioned at a wide range of positions relative to the screen. However, increasing the horizontal viewing angle may also result in increasing the vertical viewing angle beyond what is necessary for the particular application, and so the overall screen gain is reduced. As a result, certain tradeoffs are made in screen characteristics and performance in order to produce a screen that has overall acceptable performance for the particular rear projection display application.

SUMMARY OF THE INVENTION

Some rear projection screens include microstructures to waveguide light passing through the screen toward a viewer, with the space between the waveguides filled with a light absorptive material to enhance contrast. In such a construction, however, some of the light to be internally reflected in the waveguides can be lost due to absorption in the light absorptive material. One reason for this can be that the angle of incidence of light in the waveguide is less than the critical angle necessary for total internal reflection in the waveguide given the index of refraction difference between the waveguide material and the light absorptive material.

In the present invention, a rear projection screen is provided that incorporates tapered waveguides and a light absorptive layer between the waveguides at the front of the screen that creates interstitial spaces between the waveguides that can be comprised of air or another low index medium. This allows for a larger index of refraction difference at the waveguide/interstitial region interface than when the entire interstitial region is filled with absorptive material. A larger index of refraction difference can be used to increase screen efficiency as well as allow for screen designs that further enhance contrast, provide for larger viewing angles, and the like.

In one aspect, the present invention provides a rear projection screen that includes a plurality of waveguides disposed on a transmissive substrate, the waveguides tapered from a wider back portion near the substrate to a narrower front portion away from the substrate, and a light absorptive layer disposed between adjacent waveguides and located at or near the front portions of the waveguides, thereby defining interstitial regions between adjacent waveguides and the light absorptive layer, the interstitial regions having a lower refractive index than the waveguides.

In another aspect, the present invention provides a method for making a rear projection screen that includes disposing a plurality of waveguides on a transmissive substrate, the waveguides being tapered from a wider back portion near the substrate to a narrower front portion away from the substrate, and disposing a light absorptive layer between adjacent waveguides at or near the front portions of the waveguides, thereby defining interstitial regions between adjacent waveguides and the light absorptive layer, the interstitial regions having a lower refractive index than the waveguides.

DETAILED DESCRIPTION

Figure 1A:
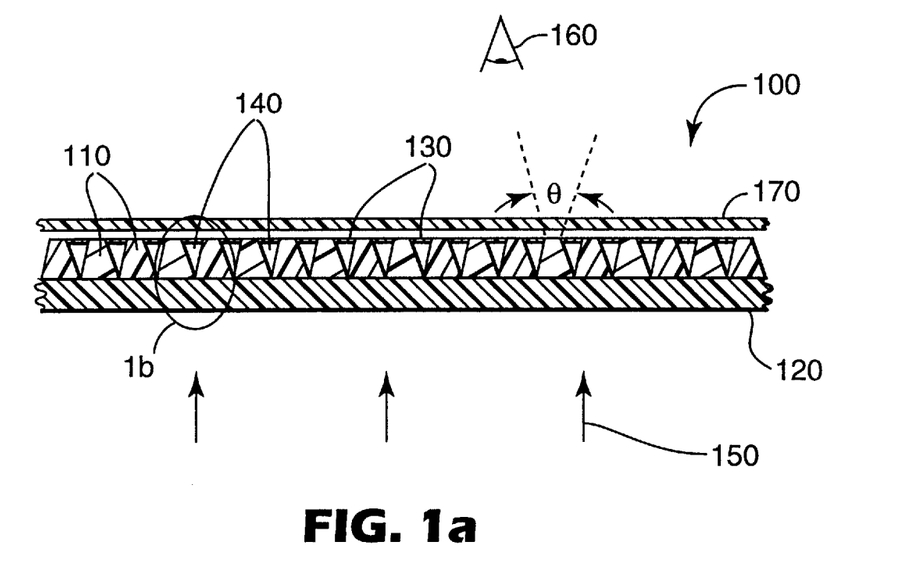
FIG. 1(a) is a schematic partial cross-section of a rear projection screen according to the present invention.

FIG. 1(a) shows a projection screen 100 that includes a series of waveguides 110 disposed on a substrate 120. Alternatively, waveguides 110 and substrate 120 can be integral. Waveguides 110 are tapered from a back side adjacent to the substrate to a front side oriented toward a viewer position 160. The degree of taper can be measured by the included angle between adjacent waveguides, designated θ in FIG. 1(a). While waveguides 110 are illustratively shown to have symmetric cross sections, their cross sections can also be asymmetric, for example having one side wall steeper than another side wall. In addition, although the tapered walls of the waveguides 110 are shown in FIG. 1(a) to be straight, they can also be curved, for example concavely or convexly.

A light absorptive layer 130 resides between adjacent waveguides on the front portions of the waveguides. Light absorptive layer 130 increases the contrast of the screen 100 and reduces glare from ambient light present on the viewer side (viewer position represented by 160). Interstitial regions 140 exist between adjacent waveguides and absorptive layer. In operation, the projection screen 100 can be oriented so that light 150 from a projector or other suitable display can be transmitted through the screen 100 toward a viewer position 160. Light may pass directly through a waveguide toward the viewer or may be reflected off a waveguide side wall and then directed through the waveguide toward the viewer.

In some exemplary embodiments, the projection screen can include a rigid substrate (not shown) on either the front side or back side (or both) of the screen to give structural integrity to the construction, for example.

In the present invention, the light absorptive layer is a layer that resides at or near the front portions of the waveguides, thereby creating the interstitial regions. The interstitial regions need not be filled with any particular material, and indeed can be made up of air or other such gaseous medium that has a refractive index that is 1 or nearly 1 (1 being the refractive index of vacuum). Alternatively, the interstitial regions can be filled with a non-gaseous material, preferably a low refractive index material. By having an interstitial refractive index that is relatively low, preferably nearly that of a vacuum, the index difference between the waveguides and the interstitial regions can be relatively large, depending on the material of the waveguides.

For light incident on waveguide side walls at angles that exceed the critical angle, the light is totally internally reflected, thereby directed out of the waveguide and toward the viewer position. The greater the ratio of the index of refraction of the waveguides 110 (index denoted $n_w$) to the index of refraction of the interstitial regions 140 (index denoted $n_i$), the smaller the critical angle, and the more likely light will be totally internally reflected and directed with minimal losses toward the viewer. This can increase the throughput, and thus the efficiency, of the screen. For simplicity, and without loss of generality, the index of refraction ratio ($n_w/n_i$) encountered at the interface between the waveguide side walls and the medium of the interstitial regions will be designated N in this document. Using this terminology, it can be said that a larger N can lead to a more efficient screen because light is more likely to be totally internally reflected, even over a wider range of incident angles, without significant losses due to penetration into the interstitial regions.

Figure 1B:
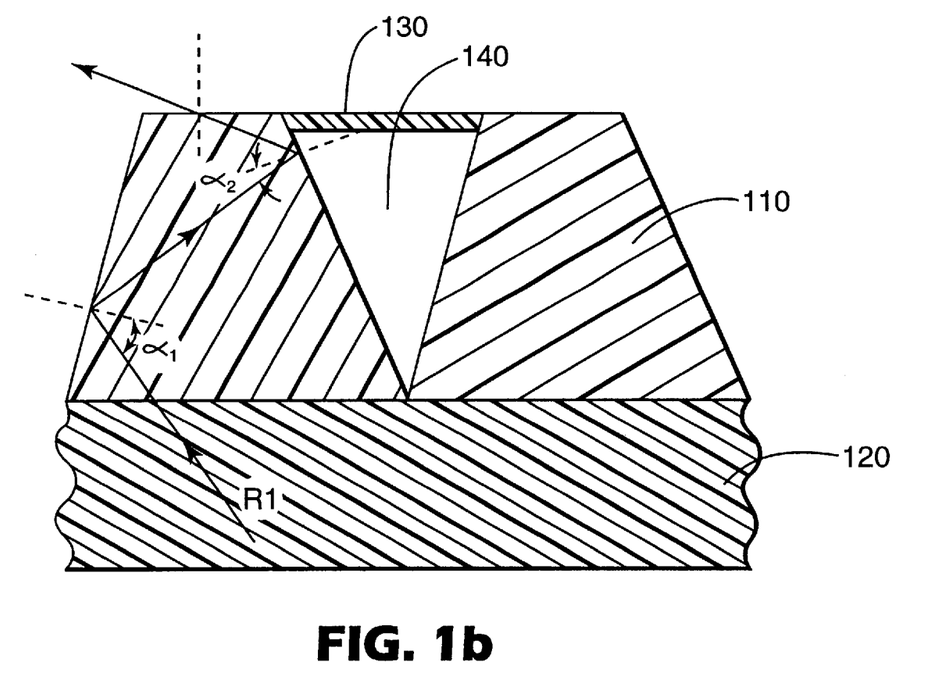
FIG. 1(b) is an enlarged view of area 1b from FIG. 1(a).

A larger N can also allow screen designs that have a higher proportional surface area coverage of light absorptive material presented to the viewer, and therefore higher contrast. This concept can be understood by referring to FIG. 1(b), which shows an enlarged view of region 1b from FIG. 1(a). FIG. 1(b) shows a light ray R that is incident on a wall of a tapered waveguide at an angle $\alpha_1$ (measured from the normal to the wall at the point of incidence). Light ray R is reflected and encounters another waveguide wall before leaving the waveguide. Because the waveguides are tapered, that is they are wider near their bases and narrower near their tops, the angle of incidence $\alpha_2$ of light ray R on the second waveguide wall is smaller than $\alpha_1$. If N is large enough, both $\alpha_1$ and $\alpha_2$ can exceed the critical angle, and total internal reflection (TIR) can occur for both reflections. However, in cases where N is smaller, $\alpha_1$ may exceed the critical angle whereas $\alpha_2$ might be smaller than the critical angle. In these cases, some light will be lost due to the lack of TIR unless the waveguides are made shorter so that light rays like light ray R can exit the waveguides before encountering a second side wall.

While shortening waveguides can lessen losses due to non-TIR reflections in the waveguides due to multiple bounces in the waveguides, it also decreases the proportional area of the light absorptive material to the waveguide tops at the front of the screen. Referring to FIG. 1(b), the portion of layer 130 shown spans the gap between the adjacent waveguides 110 near the tops of the waveguides. If the waveguides were truncated, the gap between adjacent waveguides would be smaller, thus reducing the areal coverage of the light absorptive layer, thus reducing contrast. By providing for a larger N, projection screens of the present invention allow for the design of taller waveguides (for a particular taper angle) because the critical angle for TIR is smaller, thereby accommodating more multiple reflection situations such as shown in FIG. 1(b). This in turn can increase the proportional area coverage of the light absorptive layer on the front of the screen, which increases contrast.

In addition to increasing efficiency and allowing for multiple TIR bounces in the waveguides, a larger N between the waveguides and the interstitial regions can allow for larger included wall angles (e.g., $\theta$ in FIG. 1) while maintaining high throughput. Larger wall angles can lead to more space between adjacent waveguides at their tops, which can result in a higher proportional area of the absorbing layer and thus a higher contrast. Without such large index of refraction differences at waveguide walls, increased wall angles would result in a higher probability that light would not be totally internally reflected (larger wall angles reduces the angle of incidence for a given light ray, as measured from the normal to the incident surface). Such an effect is counteracted by increasing N, thereby reducing the critical angle and allowing for larger wall angles while maintaining TIR. Higher wall angles can allow larger viewing angle ranges when increasing the range of viewable angles in one or more dimensions is a desirable property.

Projection screens of the present invention that have a relatively large N can also provide a larger range of viewing angles without substantial loss of light intensity at higher viewing angles. As described above, larger N means a lower critical angle, which allows a larger angular range of light to experience TIR in the waveguides and pass through toward the viewer without substantial losses in intensity. As a result, a larger angular range of light can exit the projection screen with relative uniformity in intensity over a larger range of viewing angles.

Waveguides 110 can be any suitable material that is substantially transmissive of light within a desired range of wavelengths, and that can be molded or otherwise formed into appropriate shapes. For example, the waveguides can be made from acrylates, polycarbonates, epoxies, and other suitable materials. To obtain a large refractive index ratio between the waveguides and the interstitial regions, the waveguides preferably have a relatively high index of refraction, for example about 1.3 or higher, more preferably about 1.4 or higher.

Waveguides can be provided on a substrate by impression molding, casting and curing a material using a mold, selective polymerization of a curable material, or by forming a film and selectively removing portions of the film to leave the waveguide structures. Preferably the bases, or back portions, of the waveguides are closely packed to fully or substantially cover the surface of the substrate on which they are formed. In this way, most of the light projected onto the back of the screen can be transmitted through the waveguides toward the viewer.

The waveguides can have any tapered shapes and dimensions suitable for a particular application. Typically, the waveguides have heights of about 50 microns to about 250 microns, maximum widths of about 50 microns to about 800 microns, and minimum widths of about 10 microns to about 400 microns. The side walls of the waveguides are tapered and can be flat or curved. If the waveguides are curved, they can be curved concavely or convexly. Curved waveguides include those that are piecewise linear.

While the waveguides are preferably substantially transmissive of visible light (or other desired portion of the spectrum), the waveguides can also include appropriate amounts of a colorant, such as a pigment or a dye, to provide filtering and/or additional contrast to the screen. Additionally, the waveguides can include particles, voids, phase dispersed materials, or other such elements to scatter and/or diffuse light as it passes through the waveguides. Such "scattering sites" can be symmetric or asymmetric, and if they are asymmetric they can be oriented, for example to scatter light preferentially along a desired axis. Suitable waveguides, materials, constructions, and methods of making are also described in commonly assigned U.S. patent application Ser. No. 09/348,809, which disclosure is incorporated into this document as if reproduced in full.

Figure 2A:
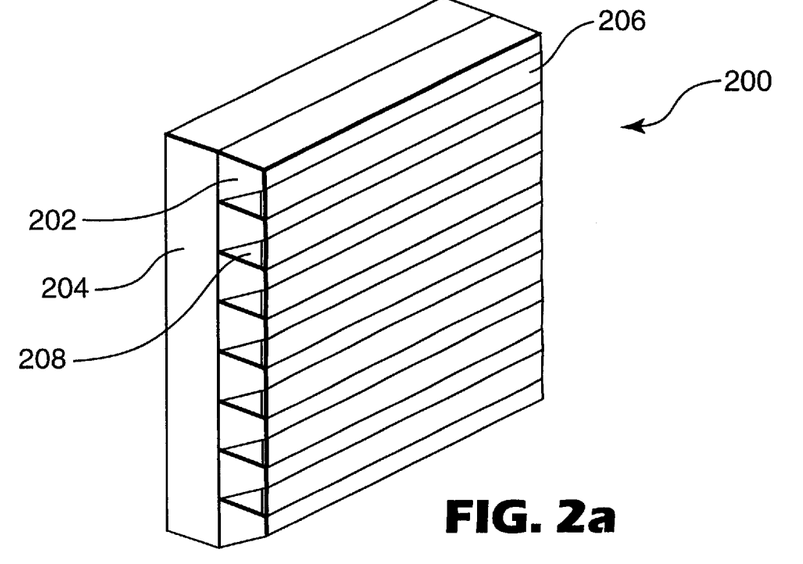
FIGS. 2(a)–(c) are schematic partial perspective views of rear projection screens according to the present invention.

FIG. 2 illustrates some examples of waveguide shapes that can be used. As with FIG. 1, the waveguides shown in FIG. 2 are symmetric for illustration, but asymmetric waveguide shapes can also be used. FIG. 2(a) shows a rear projection screen 200 that includes rib-like waveguides 202 disposed on substrate 204. Light absorptive layer 206 resides near the front of waveguides 202 and between the waveguides to create interstitial regions 208. By using rib-like waveguides, asymmetric viewing angles can be achieved. By varying the wall angles of the waveguides, the amount of viewing asymmetry can be altered.

Figure 2B:
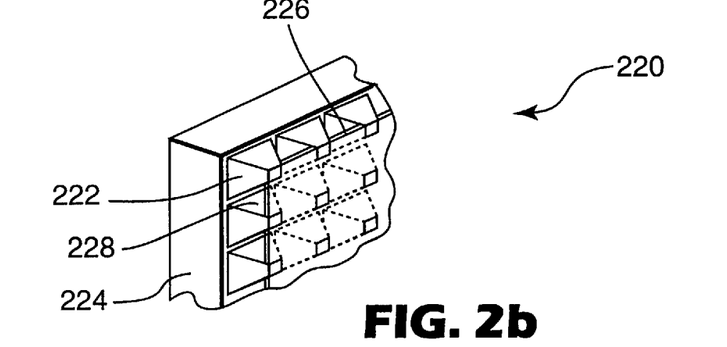

FIG. 2(b) shows a rear projection screen 220 that includes post-like waveguides 222 disposed on substrate 224. Waveguides 222 are shown to have square bases, although any suitably shaped base can be used. Light absorptive layer 226 resides near the front of waveguides 222 to create interstitial regions 228. By using square, post-like waveguides, the viewing angle can be made symmetric. In addition, post-like waveguides provide another degree of freedom when making asymmetric waveguides. For example, the angle between adjacent post-like waveguides in the vertical screen direction can be made different from the angle between adjacent post-like waveguides in the horizontal direction. This can provide for a different range of vertical and horizontal viewing angles, for example. This is one degree of freedom for design asymmetry. The other degree of freedom is in designing post-like waveguides that have a steep wall taper on one side and a shallow wall taper on the opposing side, for example. This can provide a difference in viewing angle from left to right and/or from up to down. The terms horizontal, vertical, left, right, up, and down are used illustratively, and with particular regard to FIG. 2(b), and should not be read to limit the scope of the present invention. In addition to providing more design freedom, using post-like waveguides can provide for a large proportion of the front area of screen 220 being covered by the light absorptive layer 226, as can be seen in FIG. 2(b). This can result in high contrast and glare reduction.

Figure 2C:
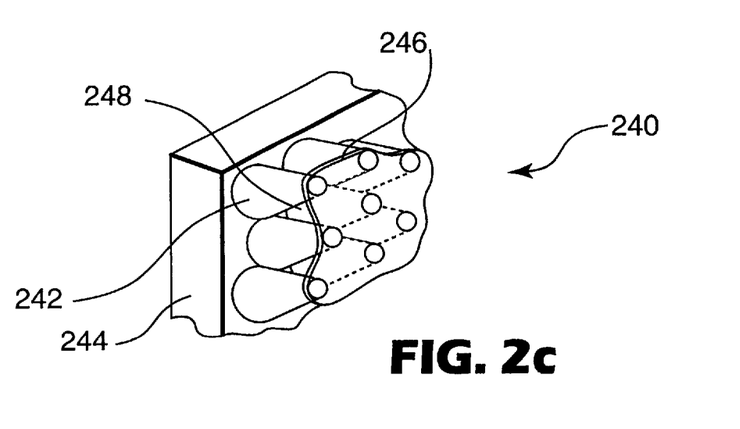

FIG. 2(c) shows a rear projection screen 240 that includes cone-like waveguides 242 disposed on substrate 244. Unlike in FIG. 2(b), waveguides 222 are shown to have circular bases. Light absorptive layer 246 resides near the front of waveguides 242 to create interstitial regions 248. Again, a large proportion of the front area of screen 240 is covered by the light absorptive layer 246, resulting in high contrast and glare reduction.

Throughput can be increased when using post-like waveguides by employing a close-packed arrangement of posts, for example a hexagonal arrangement.

Referring back to FIG. 1, substrate 120 can be any suitable material that is substantially transmissive of a desired range of wavelengths and that optionally can provide desired mechanical integrity to the screen. Examples of suitable materials includes polycarbonates, glass, polyethylene terapthalate (PET), and other suitable substrate materials. Substrate 120 can be the same material used for waveguides 110, and can be formed simultaneously with the waveguides so that the waveguides and the substrate are integral. Alternatively, the waveguides can be bonded to the substrate during molding of the waveguides or by using a laminating adhesive (e.g., an optically clear adhesive). Additionally, the waveguides can be formed on the substrate by a cast and cure method. Preferably substrate 120 has an index of refraction that is about the same as the index of refraction of the waveguides 110.

It may be desirable to give the back surface of the substrate, that is the surface of the substrate oriented away from the waveguides, a matte surface to reduce glare from the image light source. Depending on the particular construction used, when the back of the substrate is not a matte surface, some light from the imager can be specularly reflected off the back of the substrate and be redirected back through the screen at a different position than what was intended. This can cause ghost image formation.

Absorptive layer 130 typically includes a mixture of a light absorptive material dispersed in a binder. Suitable light absorptive materials include carbon black, light absorptive dyes such as black dyes or other dark dyes, light absorptive pigments or other dark pigments, and other suitable materials. Suitable binders include thermoplastics, radiation cured or thermoset acrylates, epoxies, silicone-based materials, or other suitable binder materials. Other materials such as dispersants, surfactants, viscosity modifiers, curing agents, and the like can also be included. In preferred configurations, the proportion of the waveguide wall area that is contacted by the light absorptive layer is relatively small. As such, there is less of a concern as to the relative refractive indices of the light absorptive layer and the waveguides. When absorptive layer 130 is the outermost layer of the projection screen 100, it may be desirable to provide the outer surface (the surface oriented toward the viewer) with a matte texture. This can reduce glare, especially due to glancing reflections from ambient light. In some cases, the light absorptive layer 130 is not the outermost layer of the projection screen 100. For example, a polarizer such as a linear polarizer or circular polarizer, a matte substrate, other desirable film, component, or device can be provided as an optional outermost layer 170. Such other elements can provide desirable optical, aesthetic, mechanical, and/or chemical properties as well as added functionality (for example, a touch panel user interface).

Absorptive layer 130 can be disposed over waveguides 110 in a variety of ways. For example, the light absorptive layer can be extruded directly onto the waveguide tops. Extrusion of a suitable absorptive layer material onto the waveguides can be accomplished so that the light absorptive layer material remains near the front of the waveguides and does not fill the interstitial regions. The ability to extrude absorptive layer material without filling the interstitial regions between the waveguides depends on the dimensions of the waveguides (particularly the distance between waveguides at the front portions of the waveguides), the thickness of the light absorptive layer being extruded, the viscosity of the light absorptive layer during extrusion, and/or the temperature of the waveguide substrate. Preferably, when the extrusion method is used, a thermoplastic absorptive layer material is extruded over the waveguides, the thermoplastic absorptive layer material cooling sufficiently quickly upon contact with the waveguides that the light absorptive layer material does not flow or seep down into the interstitial valleys.

Figure 3:
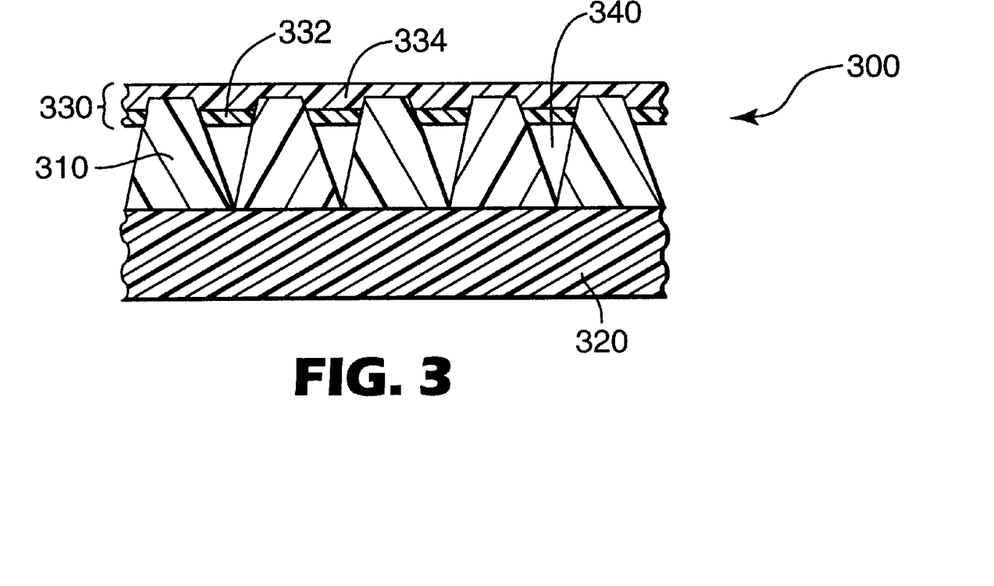
FIG. 3 is a schematic partial cross-section of a rear projection screen according to the present invention.

In some cases when the light absorptive layer is extruded over the waveguides, a residual amount of the light absorptive layer might remain on the tops of the waveguides where light exits toward the viewer. In some cases, this can undesirably reduce the intensity of light directed toward the viewer due to absorption of light in the residual absorptive layer. It may be desirable then to co-extrude a clear layer and a light absorptive layer over the waveguides, the clear layer oriented toward the viewer position. The result may be as shown in FIG. 3 where rear projection screen 300 includes a plurality of waveguides 310 disposed on a substrate 320, with co-extruded bilayer 330 disposed on the front portions of the waveguides 300. Bilayer 330 includes a light absorptive layer 332 and a clear layer 334. As shown, a portion of the bilayer 330 covers the tops of the waveguides. Because the upper layer of the bilayer is clear, the bilayer can be extruded over the waveguides so that the portion of the bilayer covering the tops of the waveguides is a portion of the clear layer rather than the light absorptive layer. The bilayer is preferably thin enough so that interstitial regions 340 are created between adjacent waveguides 310 and the light absorptive layer 332. Also, the clear layer 334 preferably has about the same index of refraction as the waveguides to reduce intensity losses due to interface reflections.

While the term clear layer is used, it is understood that any suitable material that is substantially transmissive of light in a desired range of wavelengths can be used. It is also contemplated that the clear layer can contain material to increase contrast and/or to diffuse or scatter light as it exits the waveguides. Additionally, when the clear layer is the outermost layer of the screen, the clear layer can be imparted with a matte outer surface to reduce glare, for example due to ambient light reflections.

Extruding the light absorptive layer over the waveguides can also be used to alter the shape of the front portions of the waveguides. For example, when the waveguides are made of a thermoplastic material that softens at temperatures used to extrude the light absorptive layer, contact of the extruded absorptive layer with the waveguides can cause the tops of the waveguides to "mushroom". This can be seen in FIG. 4, which shows a rear projection screen 400 that includes a series of waveguides 410 disposed on a substrate 420. Absorptive layer 430 has been extruded over the thermoplastic waveguides 410, and as a result the tops of waveguides 410 have softened to form lenslets 412. The formation of lenslets 412 can be used to change the angular dispersion of light in one or more directions as it exits the waveguides toward the viewer. While the extruded absorptive layer is hot enough to soften the waveguides, the light absorptive layer preferably cools rapidly enough to maintain an interstitial region 440 between adjacent waveguides 410 and the light absorptive layer 430.

Figure 4:
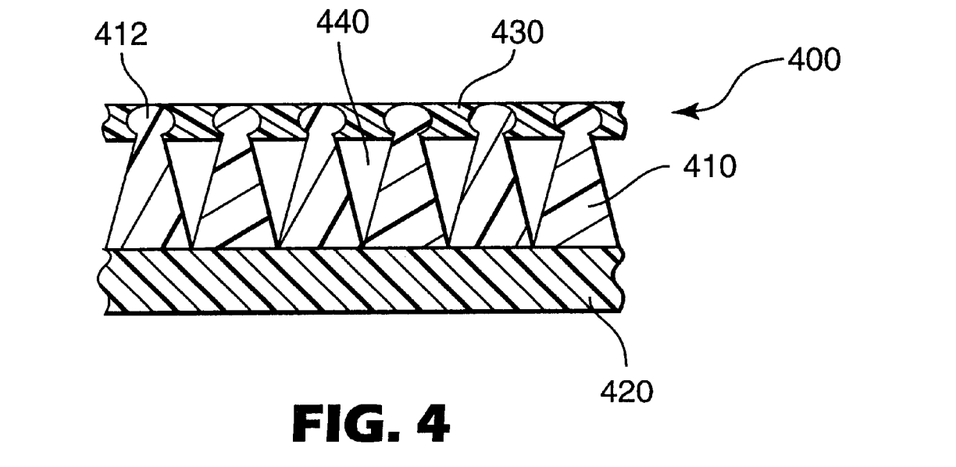
FIG. 4 is a schematic partial cross-section of a rear projection screen according to the present invention.
Figure 5:
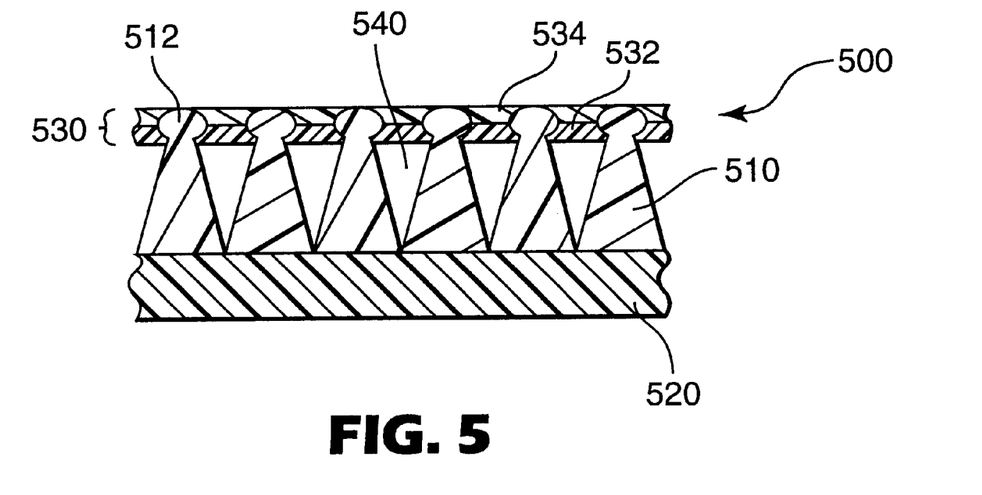
FIG. 5 is a schematic partial cross-section of a rear projection screen according to the present invention.

FIG. 5 shows an analogous situation to FIG. 4 where the extruded "layer" is a bilayer 530 of a light absorptive material 532 and a clear material 534. The screen 500 includes waveguides 510 disposed on a substrate 520. Waveguide 510 have lenslets 512 formed on their front portions during extrusion of the bilayer 530. Bilayer 530 can be extruded so that the portion of the bilayer 530 remaining between lenslets 512 and the viewer is the clear layer 534. Preferably, interstitial regions 540 are created between adjacent waveguides 510 and absorptive layer 532.

Lenslets on the front portions of tapered waveguides on projection screens can be formed by methods other than extrusion of a light absorptive layer onto thermoplastic waveguides. For example, a screen that includes a series of tapered thermoplastic waveguides disposed on a substrate can be provided. Next, a light absorptive material can be filled into the spaces between the waveguides. Then, the top portions of the waveguides can be reshaped by passing the assembly through a nip roll, optionally a heated nip roll, that "mushrooms" the tops of the waveguides, thereby forming lenslets. Variations of this method of forming lenslets, the extrusion methods discussed above, and other suitable methods of forming lenslets or of re-shaping tapered waveguides are contemplated in the present invention.

Figure 6:
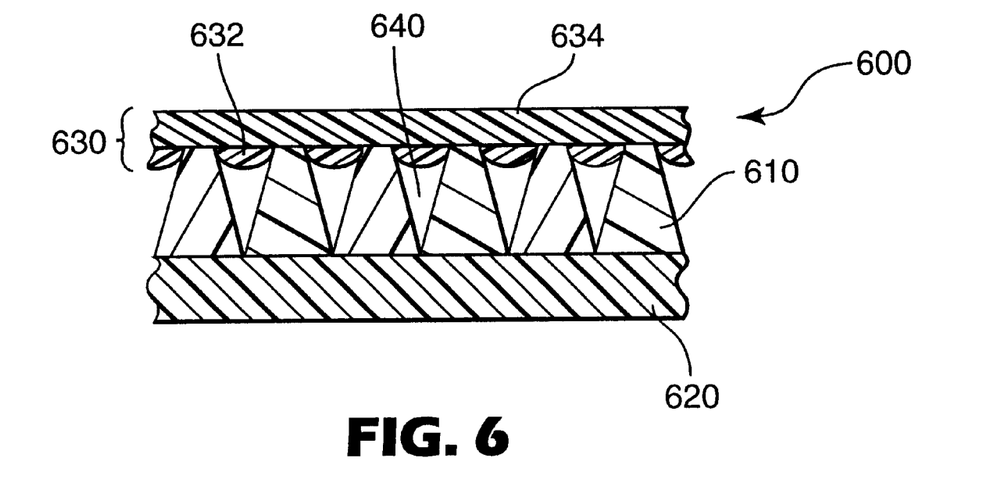
FIG. 6 is a schematic partial cross-section of a rear projection screen according to the present invention.

Absorptive layers can be formed over waveguides on projection screens of the present invention by methods other than extrusion. For example, a light absorptive layer can be laminated over, or otherwise pressed onto, the waveguides. To illustrate, FIG. 6 shows a projection screen 600 that includes a series of tapered waveguides 610 disposed on a substrate 620. A light absorptive layer 632 can be coated or otherwise disposed on a carrier layer 634 to form a "lamination assembly" 630. Lamination assembly 630 can then be laminated (or pressed) over the waveguides 610 with the light absorptive layer 632 contacting the waveguide tops. Preferably the light absorptive layer is at least somewhat flowable during lamination so that absorptive layer material between the waveguide tops and the carrier layer can be pushed out to surrounding areas. For example, the light absorptive layer can include a hot melt adhesive composition that can flow somewhat with the application of pressure and/or heat. As another example, the light absorptive layer can include a radiation curable material that can be pressed onto the waveguides before curing and then hardened on the waveguides by exposure to suitable radiation, such as ultraviolet light.

The viscosity of the light absorbing material during lamination can affect the ability to laminate the light absorptive layer on the waveguides in a desirable manner. If the viscosity is too low, the light absorptive layer material might undesirably flow down into the grooves between the waveguides. If the viscosity is too high, it may be difficult too press the light absorptive layer material out of the spaces at the tops of the waveguides. Preferably, the light absorptive material has a viscosity of about 50,000 cps to about 200,000 cps at the laminating temperature. In exemplary cases when the light absorptive layer is to be laminated over the waveguides, the light absorptive layer material has a viscosity that is about 100,000 cps at the laminating temperature.

Optionally, an adhesive can be used between the waveguide tops and the light absorptive layer to promote adhesion. Carrier layer 634 can be removable or can remain with the screen. When the carrier layer remains as part of the screen, it is preferred that the carrier layer is substantially transmissive of light within a desired range of wavelengths, and that the index of refraction of the carrier layer is about the same as the refractive index of the waveguides. Optionally, the carrier layer can include materials for contrast enhancement, light diffusion or scattering, etc. When the carrier layer remains as the outermost layer of the screen, it may be imparted with a matte surface to reduce glare. As noted above, other elements such as linear or circular polarizers, rigid substrates, touch panels, and any other suitable element that can provide desired properties and/or functionalities can also be added.

EXAMPLES

Objects and advantages of this invention are further illustrated by the following examples, but the particular materials and amounts thereof recited in these examples, as well as other conditions and details, should not be construed to unduly limit this invention.

Example 1

A rear projection screen was made in the following manner.

Rib-like waveguides like those shown in FIG. 2(a) and having cross-sections such as depicted in FIG. 1(a) were made according to the following procedure. A resin formulation was made from 80% by weight of a urethane acrylate oligomer and 20% by weight of 2-phenoxyethyl acrylate. The refractive index of the resin was approximately 1.51. Particles were then mixed into the resin formulation. The particles were a copolymer blend of ethyl methacrylate and polystyrene, and had an index of refraction of approximately 1.54. The average particle diameter was about 5 microns with a standard deviation of about 0.5 microns. A particle loading of 15% by weight relative to the resin was used. The particles were well dispersed using a high shear blender. A photoinitiator was added into the mixture in an amount of 2% by weight of the resin.

The mixture was then cast on a metal mold that had indentions with dimensions corresponding to the desired rib waveguide dimensions. An approximately 0.25 mm thick polycarbonate film (commercially available from Bayer Corporation) was applied on top of the resin in the mold and pressed in place using a roller. Excess resin was removed so that the pattern in the mold was filled with no excess that would form a land. The resin was then cured in place and adhered to the polycarbonate substrate. The substrate and the cured matrix were then removed from the tool leaving a clean metal mold for reuse. The resulting rib-like waveguides were about 250 microns tall as measured from the substrate, about 162 microns wide at their base, had an included wall angle of 18.5°, and had symmetric cross-sections. The rib tops were about 81 microns wide, thereby giving a proportional coverage of absorptive material at the front of the screen upon application of the light absorptive layer of about 0.5 of the total area of the screen.

A light absorptive material was then extruded over the rib-like waveguides. The binder for the extrudable light absorptive material was an acid/acrylate-modified ethylene vinyl acetate polymer commercially available from DuPont under the trade designation Bynel 3101. For extruding, a three-quarter inch general purpose single screw Killion extruder with a gear pump and a six inch die was used. There were a total of four zones in the extruder, which were held at temperatures of 170° C., 179° C., 190° C. and 198° C., respectively. The die temperature was held at 219° C. Polyethylene/carbon black concentrate pellets were added to the binder at to achieve about a 1% by weight concentration of carbon black pellets to the binder. The black pellets were mixed with the binder pellets in the single screw of the extruder to produce an extrudable light absorptive material. Constant throughput was maintained by the gear pump set to 7.0 rpm in order to produce an approximately 50 micron thick film at about 2.3 centimeters per second (about 4.5 feet per minute). The gap was set to about 0.4 mm (or 15 mils). The light absorptive material was extruded onto the tops of the rib-like waveguides with the direction of motion being parallel to the ribs. Very little of the light absorptive material remained on the tops of the waveguides and the resulting screen was similar to that shown in FIG. 1(a).

The resulting screen sample was measured to have a peak gain of 2.20, a horizontal viewing angle of 46.5° (horizontal viewing angle=angular viewing range in a direction perpendicular to the ribs measured at the half peak gain points), and a vertical viewing angle of 18° (vertical viewing angle= angular viewing range in a direction parallel to the ribs measured at the half peak gain points). Total transmission of the screen was approximately 72%.

Example 2

A rear projection screen was made in the following manner.

A series of parallel rib-like waveguides were formed on a polycarbonate substrate as in Example 1. The waveguides and substrate were the same materials and had the same dimensions as reported in Example 1.

Next, the following light absorptive coating formulation was weighed and mixed: 10 grams of a urethane acrylate (commercially available from Sartomer, Exton, Pa., under the trade designation CN963E75), 0.5 grams of carbon black dispersion (commercially available from Penn Color, Doylestown, Pa.), 5 grams of methyl ethyl ketone (MEK), and 0.2 grams of a photoinitiator (commercially available from Ciba Geigy, Hawthorne, N.Y., under the trade designation Daracure 4265). The formulation was coated on to an approximately 0.13 mm thick polyester film. Coating of the formulation was performed using a wire-wrapped rod. The resulting coating had a wet thickness of about 55 microns. After coating, the film was air dried to evaporate the MEK. The dry thickness of the coating was about 38 microns.

The dried light absorptive coating was then laminated at room temperature to the tops of the rib-like waveguides. Lamination was performed using a nip roll with two rubber rolls. The laminate construction was then exposed to ultraviolet radiation using a Fusion D lamp at a dose of about 0.7 Joules/cm$^2$ to cure the light absorptive coating. The resulting screen structure was similar to that shown in FIG. 6. The screen sample was measured to have a peak gain of 3.2, a horizontal viewing angle of 28°, a vertical viewing angle of 17°, and a total throughput of 68%.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method for making a rear projection screen comprising the steps of:

disposing a plurality of waveguides on a transmissive substrate, the waveguides being tapered from a wider back portion near the substrate to a narrower front portion away from the substrate; and extruding a light absorptive material over the waveguides to thereby form a light absorptive layer disposed between adjacent waveguides so that the light absorptive layer contacts the waveguides at or near the front portions of the waveguides, thereby defining interstitial regions between adjacent waveguides and the light absorptive layer, the interstitial regions having a lower refractive index than the waveguides.

2. The method of claim 1, wherein extruding the light absorptive material over the waveguides causes a local deformation at the front portion of the waveguides, thereby forming lenslets.

3. The method of claim 1, wherein extruding a light absorptive material comprises coextruding a light absorptive material and a substantially clear material onto the waveguides.

4. The method of claim 3, wherein extruding the light absorptive material over the waveguides causes a local deformation at the front portion of the waveguides, thereby forming lenslets.

5. A method for making a rear projection screen comprising the steps of:

disposing a plurality of waveguides on a transmissive substrate, the waveguides being tapered from a wider back portion near the substrate to a narrower front portion away from the substrate; and laminating a layered structure on the front portions of the waveguides, the layered structure comprising a light absorptive layer and a second layer, the light absorptive layer positioned between the waveguides and the second layer during lamination, the light absorptive layer having a viscosity in a range of about 50,000 cps to 200,000 cps under laminating conditions, thereby defining interstitial regions between adjacent waveguides and the light absorptive layer, the interstitial regions having a lower refractive index than the waveguides.

6. The method of claim 5, wherein the second layer comprises a substantially clear layer.

7. The method of claim 5, wherein the second layer comprises a release layer that can be removed from the light absorptive layer after the laminating step.

* * * * *